United States Patent
Decombe

(10) Patent No.: US 7,036,093 B2
(45) Date of Patent: Apr. 25, 2006

(54) USER INTERFACE FOR EXPLORING A GRAPH OF INFORMATION

(75) Inventor: Jean-Michel Decombe, Palo Alto, CA (US)

(73) Assignee: Groxis, Inc., San Francisco, CA (US)

( * ) Notice: Subject to any disclaimer, the term of this patent is extended or adjusted under 35 U.S.C. 154(b) by 526 days.

(21) Appl. No.: 09/875,409

(22) Filed: Jun. 5, 2001

(65) Prior Publication Data

US 2002/0054166 A1 May 9, 2002

Related U.S. Application Data

(60) Provisional application No. 60/209,505, filed on Jun. 5, 2000.

(51) Int. Cl.
*G06F 3/00* (2006.01)

(52) U.S. Cl. .................. 715/853; 715/854; 715/800; 715/821

(58) Field of Classification Search .............. 345/853, 345/854, 834, 810, 767, 821, 822, 443, 800
See application file for complete search history.

(56) References Cited

U.S. PATENT DOCUMENTS

| | | | |
|---|---|---|---|
| 5,295,243 A | | 3/1994 | Robertson et al. |
| 5,606,654 A | * | 2/1997 | Schuur .................. 345/440 |
| 5,615,325 A | | 3/1997 | Peden |
| 5,844,559 A | * | 12/1998 | Guha .................. 345/846 |
| 6,031,537 A | | 2/2000 | Hugh .................. 345/854 |
| 6,037,944 A | | 3/2000 | Hugh .................. 345/854 |
| 6,104,400 A | * | 8/2000 | Halachmi et al. ........... 345/854 |
| 6,166,736 A | | 12/2000 | Hugh .................. 345/798 |
| 6,166,739 A | | 12/2000 | Hugh .................. 345/854 |
| 6,237,006 B1 | | 5/2001 | Weinberg |
| 6,256,032 B1 | | 7/2001 | Hugh |
| 6,285,367 B1 | * | 9/2001 | Abrams et al. ............. 345/854 |
| 6,348,927 B1 | | 2/2002 | Lipkin |
| 6,393,159 B1 | | 5/2002 | Prasad et al. |
| 6,404,446 B1 | | 6/2002 | Bates et al. |
| 6,460,025 B1 | | 10/2002 | Fohn |
| 6,496,842 B1 | | 12/2002 | Lyness |
| 6,549,221 B1 | | 4/2003 | Brown et al. |
| 6,604,108 B1 | | 8/2003 | Nitahara |
| 6,628,304 B1 | | 9/2003 | Mitchell |
| 2001/0034733 A1 | | 10/2001 | Promt et al. |

FOREIGN PATENT DOCUMENTS

| | | |
|---|---|---|
| WO | WO 00/1104 | 3/2000 |
| WO | WO 01/15011 | 3/2001 |

OTHER PUBLICATIONS

Bederson et al, Pad++: A Zoomable Graphical Sketchpad For Exploring Alternate Interface Physics, Journal of Visual Languages and Computing, vol. 7, 1996, UK.

Bederson et al, Pad++: A Zoomable Graphical Sketchpad For Exploring Alternate Interface Physics, Symposium on User Interface Software and Technology, 1994, Marina del Rey, CA.

(Continued)

*Primary Examiner*—Raymond J. Bayerl
*Assistant Examiner*—Kieu D. Vu
(74) *Attorney, Agent, or Firm*—Strategic Patent Services, Inc.; Gary Zalewski

(57) ABSTRACT

A method for displaying a source node having connections to contained nodes and linked nodes peripherally within and around the source node to which they are connected, computing a focus position for each of the contained and linked nodes; displaying a first contained node at an inclusion start angle, and displaying a first linked node at an adjacency start angle. Focus positions are calculated for a first contained node and a first linked node based on the start angles, a direction of rotation, either clockwise or counterclockwise, and the number of contained and linked nodes connected to the source node.

20 Claims, 3 Drawing Sheets

OTHER PUBLICATIONS

Hightower et al, Graphical Multiscale Web Histories: A Study of PadPrints, ACM Conference on Hypertext, Jun. 20, 998, Pittsburg, PA.

Bederson et al, Implementing a Zooming User Interface: Experience Building Pad++, Software: Practice and Experience, vol. 28, No. 10, Aug. 1998, West Sussex, England.

Perlin et al, Pad—An Alternative Approach to the Computer Interface, ACM Siggraph, 1993, Anaheim, CA.

Bederson et al, A Zooming Web Browser, SPIE Multimedia Computing and Networking, vol. 2667, pp 260–271, 1996, San Jose, CA.

Bederson et al, A Zooming Web Browser, Human Factors in Web Development, Lawrence Eribaum Assoc., pp 255–266, 1998, Mahwah, NJ.

Bederson et al, Space–Scale Diagrams: Understanding Multiscale Interfaces, ACM SIGCHI, 1995, Denver CO.

Bederson et al, Advances in the Pad++ Zoomable Graphics Widget Bederson, USENIX Tcl/Tkm'95 Workshop, 1995, Toronto, CA.

Bederon et al, Pad++ A Zoomable Graphical Interface, ACM SIGCHI '94, 1994, Boston, MA.

* cited by examiner

USER INTERFACE FOR EXPLORING A GRAPH OF INFORMATION

This application claims the benefit of U.S. Provisional Application No. 60/209,505, filed Jun. 5, 2000. This application is related to U.S. patent application Ser. No. 09/859,343, filed May 16, 2001, entitled An Improved User Interface for Displaying and Exploring Hierarchical Information, presently pending, and U.S. patent application Ser. No. 09/866,346, filed May 24, 2001, entitled User Interface for Bicontextual Exploration of a Graph, presently pending.

FIELD OF THE INVENTION

The present invention relates to a user interface optimized to display and explore a graph of information via a display device for an electronic device such as a computer, personal digital assistant, television, cellular telephone, etc.

BACKGROUND OF THE INVENTION

The user interface described herein makes it possible to explore very large collections of connected objects, without imposing any limitation on the number of nodes contained within a node, or on the number of links between a node and other nodes. Parameters can be adjusted to let a user explore the breadth of the hierarchy or the relational context in several ways.

This user interface differs from the user interface described in the above referenced patent applications, primarily by adjusting the focus centering on click behavior, and by introducing a focus dragging behavior. In other respects, the user interface is similar when the breadth of the hierarchy or the relational context does not lead to scalability issues, for instance when content readability is not affected.

BRIEF DESCRIPTION OF THE DRAWINGS

The present invention is illustrated by way of example, and not necessarily by way of limitation in the figures of the accompanying drawings in which like reference numerals refer to similar elements.

FIG. 1 illustrates a source node of cardinal equal 6 and degree equal to 3, according to one embodiment of the invention.

FIG. 2 illustrates focus positions for the 20th of 100 contained nodes and the 30th of 50 linked nodes, according to one embodiment of the invention.

FIG. 3 illustrates scalability indicators at various source node sizes, for a minimum node count equal to 5, according to one embodiment of the invention.

FIG. 4 illustrates a crevice-like scalability indicator viewed directly from above, according to one embodiment of the invention.

FIG. 5 illustrates an inclusion tab and adjacency tab, according to one embodiment of the invention.

DETAILED DESCRIPTION OF THE INVENTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data within a memory of an electronic device such as a computer. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical, optical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise apparent from the following discussion throughout the description, discussions using terms such as "processing" or "computing" or "calculating" or "determining" or "displaying" or the like, refer to the action and processes of a computer system, or other electronic device, that manipulates and transforms data represented as physical (electronic) quantities within the device's registers and memories into other data similarly represented as physical quantities within the memories or registers or other such information storage, transmission or display devices.

The invention also relates to apparatus for performing the operations herein. These apparatus may be specially constructed for the required purposes, or may comprise a general-purpose computing or electronic device selectively activated or reconfigured by a program stored in the device. Such a program may be stored in a machine-readable storage medium, such as, but not limited to, any type of magnetic or other disk storage media including floppy disks, optical storage media, CD-ROMs, and magnetic-optical disks, read-only memories (ROMs), random access memories (RAMs), EPROMs, EEPROMs, magnetic or optical cards, flash memory devices; electrical, optical, acoustical or other form of propagated signals (e.g., carrier waves, infrared signals, digital signals, etc.); etc. or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A user interface in accordance with the present invention can be used to explore any kind of graph of information, for example, directories, query result sets (from databases engines, search engines, etc.), file stores, where information objects are organized in hierarchical sets and connected through relations. Furthermore, the user interface contemplated by the present invention can be used on or in conjunction with any platform that has a pointing device (e.g., mouse, trackball, stylus, directional pad, remote control, etc.), including personal computers, Internet appliances, personal digital assistants, telephones, mobile or cellular telephones, television sets, etc. It is also contemplated that the user interface can be controlled through speech, eye movement, and other modalities.

Figure 1:
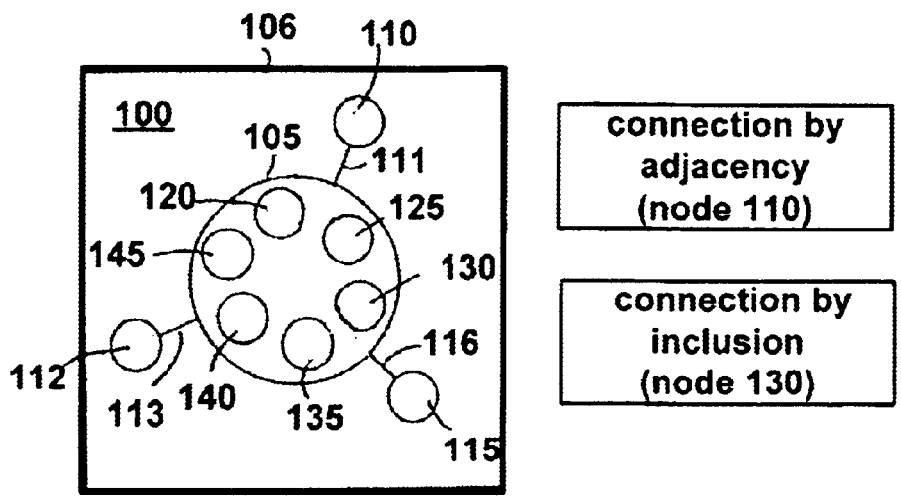

With reference to FIG. 1, in accordance with the invention, access to a graph of information 100 is provided. The graph comprises nodes of information, or simply, nodes. A node of interest or focus for a user viewing and accessing the graph of information 100 is called the focus node 105, or simply, focus 105. The focus 105 can and is expected to change as the user explores the graph.

The graph of information 100 is displayed within a viewing region 106, or view, of a given size, known as the view size. Often times, the view size is, at least in part, a function of the viewable area of a display device, and may also be affected by the size of a window displayed on the display device in which window the graph of information is displayed. The focus 105, in one embodiment, essentially is centered in the viewing region, and occupies a certain percentage of the view size, known as the focus-to-view size ratio, or more simply, focus-to-view ratio. Other nodes displayed in the viewing region are displayed inside the focus, if the focus contains the nodes, e.g., nodes 120–135, or outside the focus, if the nodes are related with the focus, e.g., nodes 110, 112, and 115. To be displayed, nodes need to intersect with the viewing region and be larger than a certain size, known as the minimum node size.

In general, a graph is composed of connected nodes, where each connection can be individually rendered by inclusion or by adjacency. In a hierarchy of nodes, all connections between nodes would usually be rendered in a similar manner, for example, by inclusion. A graph, also known as a tree, however, has fewer mathematical constraints than a hierarchy. For instance, there might be several connections leading to a given node in a graph.

Again with reference to FIG. 1, node 105 is the node of focus in the graph, that is, the user has selected node 105 for examination, and the user interface responds by centering and expanding the node for examination, as illustrated. Node 110 is adjacent to node 105 and is connected thereto by branch 111. Nodes 112 and 115 likewise are adjacent to node 105 and are respectively connected to node 105 by branches 113 and 116. Nodes 120–145, on the other hand, are rendered by inclusion, that is, the nodes are included within, and hierarchically below, node 105.

It should be noted that the rendering of a connection is not necessarily limited to inclusion or adjacency. For example, in one embodiment of the present invention, it is also possible to render a connection by extraction, i.e. by displaying the connected node outside of the view, for instance, in tabular form.

The nodes whose connections with the focus node are rendered by adjacency are displayed around the focus node and form, along with other visible nodes connected with them by adjacency, what is known as the relational context. For example, nodes 110, 112, and 115 form the relational context for focus node 105.

A node, known as a source node, may visually contain any number of nodes. In FIG. 1, the focus node 105 is the source node. Its connections to the contained nodes are all rendered by inclusion. For example, node 145 is connected to node 105 by inclusion. The number of contained nodes is known as the source node's cardinal. Source node 105, for example, has a cardinal of 6. Similarly, source node 105 may visually display any number of incoming and outgoing links from and to other nodes; its connections from and to these linked nodes are all rendered by adjacency. The number of linked nodes, or links, is known as the source node's degree. Node 105 has a degree of 3.

All contained nodes and all linked nodes are arranged peripherally within and around the source node to which they are connected. Due to hardware and human limitations (for example, screen resolution, view size, content readability, etc.), it is not always possible to simultaneously display all these nodes. Yet, it is possible to compute a fixed position for each of them, known as their focus position. Since both the set of contained nodes and the set of linked nodes are ordered, even if arbitrarily, the first contained node is placed at an angle known as the inclusion start angle, while the first linked node is placed at an angle known as the adjacency start angle.

Also, since users can scan the peripheral layout either clockwise or counterclockwise, this direction can be assigned separately for contained nodes (inclusion scan direction) and linked nodes (adjacency scan direction). The clockwise direction's value is, for example, −1, while the counterclockwise direction's value is, for example, +1. Thus, the nth contained node's focus position is at angle (inclusionStartAngle+inclusionScanDirection•2π•n/cardinal), while the pth linked node's focus position is at angle (adjacencyStartAngle+adjacencyScanDirection•2π•p/degree).

Figure 2:
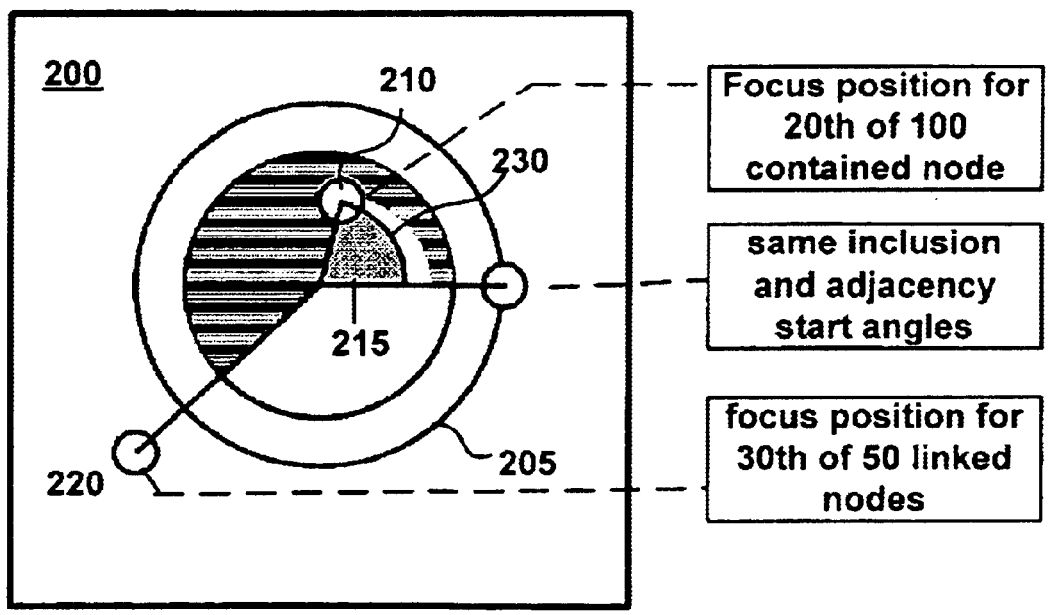

With reference to FIG. 2, a source node 205 in a graph of information 200 has connected therewith a contained node 210, the $20^{th}$ of 100 contained nodes, and a linked node 220, the $30^{th}$ of 50 linked nodes. The inclusion start angle and adjacency start angle, in this example, is the same, as shown at 215, at zero degrees (0°) in a Cartesian plane. The inclusion scan direction and adjacency scan direction is, in this example, also the same, in a counterclockwise direction. The contained node's 210 focus position 230 is thus at angle (0+1•2.π•20/100), or 1.26 radians. The adjacent node's 220 focus position 235 is thus at angle (0+1•2π•30/50), or 3.78 radians.

Please note the layout of nodes need not be restricted to the peripheral layout, as described above. Such layout is used here to keep the description of the invention simple. For example, the present invention would apply equally well to nodes arranged in a concentric layout. Also, source nodes may have various shapes, such as circles, triangles, squares, hexagons, and so on. Additionally, the distance between any two juxtaposed nodes, in the hierarchy or in the relational context, need not be constant.

Any source node keeps a reference to one of its contained nodes, known as the inclusion focus node, and a reference to one of its linked nodes known as the adjacency focus node. As shall be described later, the user can set the inclusion focus node or the adjacency focus node, usually by selecting via an input device, e.g., clicking with a mouse, the desired node. By default, these nodes are the first of their respective set of contained or linked nodes.

It should be noted that inclusion focus nodes and adjacency focus nodes usually are preserved as users explore content (nodes in the graph). It is however possible to reset these nodes to their default value each time a source node is explored (i.e., becomes the view's focus node) again.

If a source node is the view's focus node, and all its contained nodes and linked nodes can be displayed without overlapping each other, and at least at the minimum node size, then there are no scalability issues to address in the viewing region. If however all contained and linked nodes cannot be displayed without overlapping each other, then the source node may be rendered to indicate this fact, for example as a convex shape, to indicate that the contained nodes are too small to be displayed, and/or with a convex border or halo, to indicate that the linked nodes are too small to be displayed. Unfortunately, if the source node's cardinal or degree is quite large, meaning that there is many contained nodes or many linked nodes, it may be impossible for a user to view that many contained or linked nodes, even with a reasonably large view size on a reasonably large display. Instead, the user can end up with a very large focus node, with a convex shape and border, whose connections cannot be fully explored.

One embodiment for addressing this issue is to always render the inclusion focus node and the adjacency focus node at their respective focus position, then to render as many neighboring nodes as possible, both clockwise and counterclockwise, albeit increasingly away from these nodes' respective focus position, while ensuring that all these nodes are rendered in at least the minimum node size. Once the entire source node's perimeter has been almost filled with nodes, there is still at least one contained or linked node that remains to be rendered, but cannot be rendered for lack of space. Therefore, an indication of such nodes currently invisible presence, known as the scalability indicator, is displayed instead in the remaining space, at the position opposite to the inclusion focus node's position or the adjacency focus node's position. One possible representation for the scalability indicator is an ellipsis symbol.

Since nodes may have various sizes, some of the nodes next to the inclusion focus node might be too small to be displayed, because their size is less than the minimum node size. In that case, the source node may have a concave, tunnel-like appearance. The same can happen to nodes next to the adjacency focus node, in which case the links leading to such nodes are simply not terminated.

The remaining space where the scalability indicator is rendered can have a different size for the hierarchy where it is known as the inclusion scalability indicator range, and for the relational context, where it is known as the adjacency scalability indicator range. Both ranges could be an angular value in the domain $]0, 2\pi[$, as expressed in radians.

As the size of the source node is increased, more contained nodes within it and more linked nodes around it are revealed, until all such nodes become visible, in which case the scalability indicators disappear. Unless all contained nodes can be displayed simultaneously, there must be enough space for at least a certain number of nodes, known as the minimum node count, for any of the nodes to be displayed, even if they are already larger than the minimum node size. Until that happens, the source node still preserves a convex appearance. In one embodiment, there is no minimum node count constraint for linked nodes.

Figure 3A:
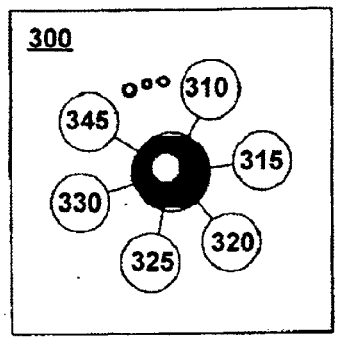

With reference to FIG. 3(a), a viewing region 300 is displayed. A source node 305 is the view's focus node, and has more contained nodes than can be displayed, at a minimum node size, without overlapping each other, thus presenting scalability issues in the viewing region. The source node is rendered, for example, as a convex shape, to indicate that the contained nodes are too small to be displayed.

In FIG. 3(a), the source node's degree large, meaning that there is many contained nodes and/or many linked nodes, making it impossible for a user to view that many contained or linked nodes, even with a reasonably large view size on a reasonably large display. Recall from the discussion above that nless all contained nodes can be displayed simultaneously, there must be enough space for at least a certain number of nodes, known as the minimum node count, for any of the nodes to be displayed, even if they are already larger than the minimum node size, and until that happens, the source node maintains a convex appearance. Thus, the source node 305 has a convex shape. Moreover, an adjacency focus node 310 is rendered at its respective focus position, and then five neighboring linked nodes 315–345 are rendered, in the clockwise direction, away from the adjacency focus nodes' respective focus position. These linked nodes 315–345 are rendered in at least the minimum node size. Once the entire source node's 305 perimeter has been almost filled with linked nodes, an indication of missing linked nodes 346, that is, the scalability indicator, is displayed instead in the remaining space between linked nodes 310 and 345, at the position opposite to the adjacency focus node's 310 position. The representation for the scalability indicator is the ellipsis symbol 346.

Figure 3B:
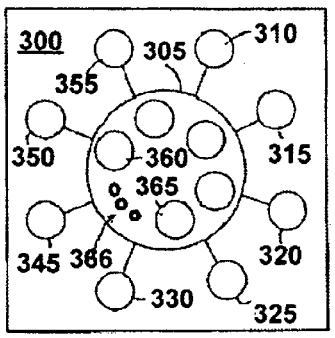
Figure 3C:
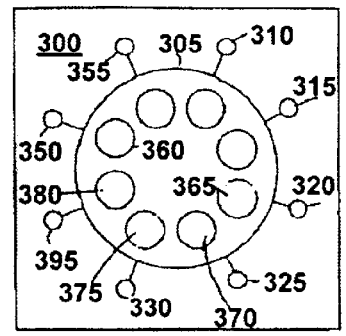
Figure 4:
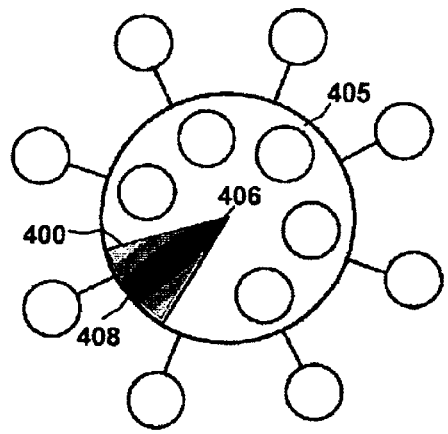

In FIG. 3(b), as the size of the source node 305 is increased, contained nodes within it are displayed at least at the minimum node size or greater, e.g., contained nodes 360–365, and more linked nodes around it are revealed, e.g., linked nodes 350 and 355, until all such linked nodes become visible, in which case the scalability indicator 346 disappears. Not all contained nodes are displayed, hence scalability indicator 366 is displayed, indicating such. However, in FIG. 3(c), as the size of source node 305 is increased further still, until all contained nodes are revealed and become visible, including contained nodes 370, 375 and 380, and scalability indicator 370 disappears.

It is appreciated that the scalability indicator could take various forms, and does not have to look the same for both the hierarchy and the relational context. For example, while an ellipsis symbol 366 is used for the relational context in FIG. 3(b), a crevice 400 starting at the source node's 405 center 406 and widening towards it edge 408 could be used instead for the hierarchy, adding a three-dimensional touch and suggesting, through its depth, the potentially large number of hidden nodes about to disappear into or reappear from the crevice as the user explores the set of contained nodes. It is contemplated that such a scalability indicator works especially well when content is displayed and seen through a three-dimensional perspective.

Focus centering on a click of a user input device, such as clicking a mouse, is the standard way to explore content. Additionally now, when a node is clicked in the hierarchy of nodes, it becomes not only the view's focus node but also the inclusion focus node of its source node. Similarly, when a node is clicked in the relational context, it becomes not only the view's focus node but also the adjacency focus node of its source node. What this means, in both cases, is that the clicked node becomes, should a scalability issue arise, the center of the subset of contained or linked nodes displayed within or around the source node.

Exploring the full sets of contained and linked nodes for the view's focus node, i.e. the source node, in absolute fashion, is contemplated in one embodiment of the invention. The scalability indicator can be dragged around the source node's center to change its position, which will in turn change the inclusion focus node or the adjacency focus node of the source node, and thereby the subset of contained or linked nodes actually displayed.

Exploring the full sets of contained and linked nodes for the view's focus node, in relative fashion, is also contemplated in one embodiment of the invention. First, the vicinity of a contained node is defined as the set of points that lie within the source node that contains it, but not within the node itself, and that are closer to the node than to any other node within the source node. If the vicinity of a node in the hierarchy, not the node itself, is clicked, the node only becomes the inclusion focus node of its source node, but not the view's focus node. The concept of vicinity cannot be applied to linked nodes, because clicking the vicinity of a linked node is equivalent to clicking the hierarchy displayed below and around this node. However, by clicking the link between the linked node and its source node instead, the node becomes the adjacency focus node of its source node, while the view's focus node is unchanged.

An alternative embodiment for making a node the inclusion or adjacency focus node of the source node without clicking on the node is to simply move around the pointer above the target node or its vicinity. In one embodiment, a user may configure this option. In any case, recognizing the vicinity of a linked node is appropriate, because it does not prevent the user from clicking it in order to select a node in the hierarchy to make it the view's focus node.

Figure 5:
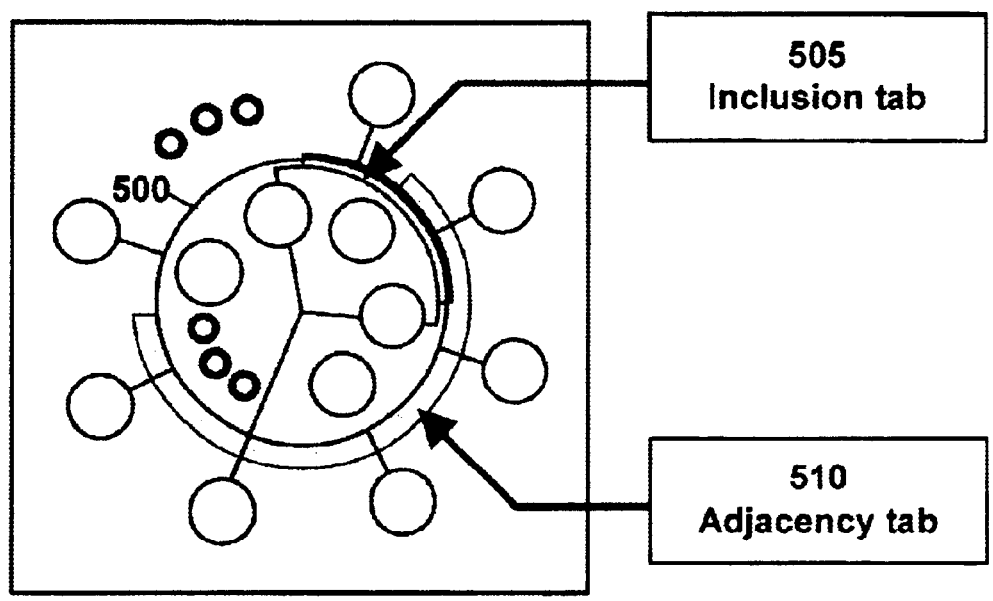

With reference to FIG. 5, arc-shaped tabs, known as the inclusion tab 505 and the adjacency tab 510, can be displayed, in one embodiment of the invention, to indicate the range of nodes displayed within and around a source node. Since node shapes are not limited to circular ones, the tabs may actually be polygon-shaped, i.e., like a series of connected segments. Tabs may also have various appearances: slice-shaped, etc.

The inclusion tab 505 is displayed along and inside the source node 500, and may be centered around the inclusion focus node's position, while the adjacency tab 510 is displayed along and outside the source node, and may be centered around the adjacency focus node's position. The ratio of the inclusion tab's length to the source node's perimeter is equal to the ratio of the number of contained nodes actually displayed to the source node's cardinal. Similarly, the ratio of the adjacency tab's length to the source node's perimeter is equal to the ratio of the number of linked nodes actually displayed to the source node's degree. Like scalability indicators, tabs are not displayed if all contained or linked nodes are visible. Otherwise, the user can drag the tabs around the source node to see more nodes that are currently not visible, thereby changing the inclusion focus node or the adjacency focus node on the fly.

It is possible, as an option, to display the inclusion start angle, so as to make it easier for the user to see the position of the first node in the ordered set of contained nodes, and be able to scan this set more quickly. If the inclusion tab is displayed, the representation used to indicate the inclusion start angle can be clicked to make the first contained node the new inclusion focus node. An alternative way of achieving this could be to, for example, doubleclick the scalability indicator. The mechanism just described applies equally to the adjacency start angle as well.

What is claimed is:

1. A user interface system comprising:
   a plurality of nodes organized into a hierarchy of information,
   at least one node in said plurality being a source node,
   said source node having focus,
   said source node represented substantially as a circle,
   said source node substantially centered in a view,
   said source node encircling a sub-hierarchy of nodes,
   a scalability indicator to identify the presence of invisible nodes,
   a tab to facilitate changing of nodes displayed in the view,
   wherein a user input device may be used to set view focus and modify view.

2. The user interface system of claim 1, wherein the scalability indicator may be dragged around the source node's center to change the subset of nodes that are hidden and displayed.

3. The user interface system of claim 1 wherein the tab is represented by an arc substantially along the perimeter of the source node.

4. The user interface system of claim 3 wherein the length of the tab is related to the number of invisible nodes.

5. The user interface system of claim 3 wherein the size of the tab is related to the number of invisible nodes.

6. The user interface system of claim 1, wherein the nodes are drawn by computing a focus position for each of the nodes in the sub-hierarchy and displaying a first contained node at an inclusion start angle.

7. The user interface system of claim 6, wherein the computation of the focus position for a node is based on the inclusion start angle, an inclusion scan direction and the number of contained nodes.

8. The user interface system of claim 1, further including and a plurality of adjacent nodes drawn peripherally outside and linked to the source node and wherein the tab is an adjacency tab.

9. The user interface system of claim 1, wherein the tab is an inclusion tab.

10. The user interface system of claim 9, wherein the inclusion tab is drawn on the inside of the source node.

11. The user interface system of claim 9, further including a plurality of adjacent nodes drawn peripherally outside and linked to the source node, and, an adjacency tab in addition to the inclusion tab.

12. The user interface system of claim 11, wherein the adjacency tab may protrude above and overlap the inclusion tab.

13. The user interface system of claim 1, wherein the scalability indicator is represented as an ellipsis or crevice.

14. The user interface system of claim 13, wherein the crevice is represented in a three-dimensional manner.

15. A user interface system comprising:
   a plurality of nodes organized into a hierarchy of information,
   at least one node in said plurality being a source node,
   said source node having focus,
   said source node represented substantially as a circle,
   said source node substantially centered in a view,
   said source node encircling a sub-hierarchy of nodes,
   a scalability indicator to identify invisible nodes,
   wherein a user input device may be used to set view focus and modify view.

16. The user interface system of claim 15, wherein the scalability indicator may also facilitate changing of nodes displayed in the view.

17. The user interface system of claim 16, wherein the scalability indicator is dragged around the source node's center to change the subset of nodes that are hidden and displayed in the sub-hierarchy.

18. The user interface system of claim 17, further including and a plurality of adjacent nodes drawn peripherally outside and linked to the source node and wherein the scalability indicator is dragged around the source node's center to change the subset of nodes that are hidden and displayed that are adjacent to the source node.

19. The user interface system of claim 18, wherein the scalability indicator is represented as an ellipsis or a crevice.

20. A user interface system comprising:

a plurality of nodes organized into a hierarchy of information, at least one node in said plurality being a source node, said source node having a focus, said source node represented as a circle, said source node substantially centered in a view, said source node encircling a sub-hierarchy of nodes and having a plurality of adjacent nodes drawn peripherally outside and linked to the source node, a scalability indicator to identify invisible nodes, a tab to facilitate changing of nodes displayed in the view, wherein a user input device may be used to set view focus and modify view.

* * * * *